(12) United States Patent
Michener et al.

(10) Patent No.: US 7,817,184 B1
(45) Date of Patent: Oct. 19, 2010

(54) METHODS AND APPARATUS TO TEST RECEIVERS

(75) Inventors: James A. Michener, Grass Valley, CA (US); Leon J. Stanger, Farmington, UT (US); Michael R. Munsell, Playa del Rey, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1251 days.

(21) Appl. No.: 11/376,055

(22) Filed: Mar. 15, 2006

(51) Int. Cl.
*H04N 17/00* (2006.01)
(52) U.S. Cl. .................................................. 348/189
(58) Field of Classification Search ................ 348/189, 348/180, 181, 184, 187, 192, 193
See application file for complete search history.

(56) References Cited

U.S. PATENT DOCUMENTS

| | | | |
|---|---|---|---|
| 4,514,806 A * | 4/1985 | Hartig | 714/25 |
| 5,122,875 A | 6/1992 | Raychaudhuri et al. | |
| 5,138,452 A | 8/1992 | Soloff | |
| 5,475,435 A | 12/1995 | Yonemitsu et al. | |
| 5,608,464 A | 3/1997 | Woodham | |
| 5,677,735 A | 10/1997 | Ueno et al. | |
| 5,678,835 A | 10/1997 | Sung et al. | |
| 5,731,839 A * | 3/1998 | Panaro | 375/240.15 |
| 5,768,535 A | 6/1998 | Chaddha et al. | |
| 5,768,561 A | 6/1998 | Wise | |
| 6,011,868 A * | 1/2000 | van den Branden et al. | 382/233 |
| 6,175,592 B1 | 1/2001 | Kim et al. | |
| 6,271,879 B1 * | 8/2001 | Overton | 348/180 |
| 6,359,897 B1 | 3/2002 | Hessel et al. | |
| 6,400,400 B1 * | 6/2002 | Isnardi et al. | 348/180 |
| 6,493,023 B1 * | 12/2002 | Watson | 348/180 |
| 6,532,256 B2 | 3/2003 | Miller | |
| 6,557,061 B1 | 4/2003 | Hindie et al. | |
| 6,747,630 B2 | 6/2004 | Pathak | |
| 6,891,565 B1 * | 5/2005 | Dieterich | 348/180 |
| 7,391,434 B2 * | 6/2008 | Yang | 348/181 |
| 2002/0046308 A1 * | 4/2002 | Devlin et al. | 710/65 |
| 2003/0076418 A1 * | 4/2003 | Nishio | 348/180 |
| 2003/0103566 A1 | 6/2003 | Stenzel | |
| 2003/0126293 A1 | 7/2003 | Bushey | |
| 2004/0155980 A1 | 8/2004 | Itoh et al. | |

* cited by examiner

*Primary Examiner*—Paulos M Natnael

(57) ABSTRACT

Methods of testing receiver video fidelity are disclosed. One example method includes producing a video test signal; coupling the video test signal into an input of the receiver, wherein the video test signal is configured to cause a decoder to output a step function signal upon processing the video test signal; coupling the step function signal to a display rate converter; and measuring signal characteristics of signals provided at a receiver output.

20 Claims, 7 Drawing Sheets

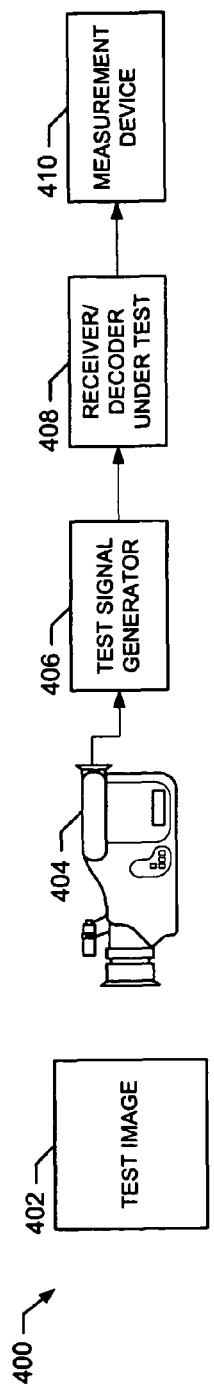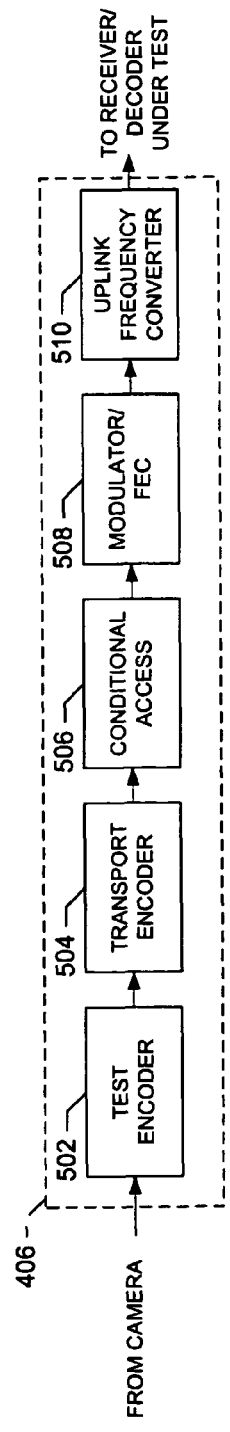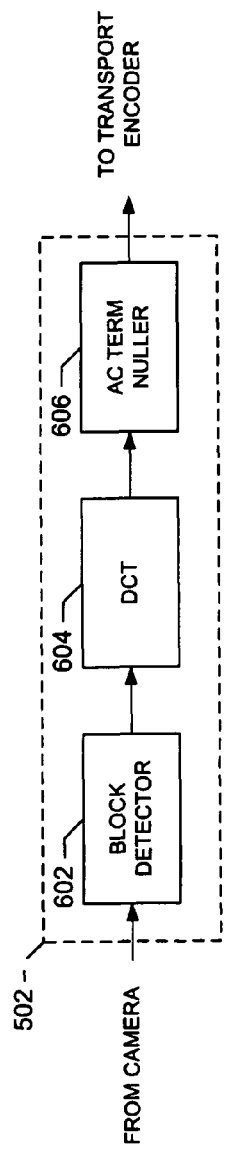

METHODS AND APPARATUS TO TEST
RECEIVERS

TECHNICAL FIELD

The present disclosure pertains to television receivers and, more particularly, to methods and apparatus to test receivers.

BACKGROUND

Conventional television signal distribution provides approximately 500 vertical lines of resolution by transmitting luminance and chrominance information on analog signals having bandwidths that are typically less than 5 megahertz (MHz). Conventional television sets receive the analog signals and modulate the operation of a display device, such as an electron gun or a liquid crystal display (LCD) panel, to present the luminance and chrominance information on a video screen as video to a viewer. This form of television is referred to as standard definition television (SDTV).

In the 1990's high definition television (HDTV) began to emerge. As the name implies, HDTV provides higher resolution than SDTV by providing more pixels, or lines, of information for presentation on a video screen. HDTV broadcasts have become common; major networks now broadcast programming using both conventional SDTV and HDTV. Additionally, high definition (HD) equipment, such as HD receivers and televisions, has become widely available at reasonable prices. In fact, many televisions available today are capable of presenting video in HD and standard definition (SD) modes. While some televisions include HD receivers, some rely on external receivers present in set-top boxes (STBs) to perform the necessary decoding and processing of HDTV signals. Such STBs receive and process HDTV signals and provide component outputs (e.g., Y, B-Y, and R-Y) or composite outputs to HDTVs. The HDTVs, in turn, receive the outputs from the STBs and present the video on the HD display screen.

One problem that has arisen with the existence of both SDTV and HDTV programming, as well as the presence of SD equipment and HD equipment, is the presentation of SDTV programming on HD displays.

Displaying SDTV information on SD equipment is well known. The television industry has adopted the approach of keeping the overall transmission system response of an SDTV signal as flat as possible up to the display, when processing horizontal and vertical video information is done to achieve the best image quality. That is, the receivers, mixers, amplifiers, including the entire broadcast chain and other system components are designed to provide as flat of a frequency response as possible. Conventionally, a color display is a cathode ray tube (CRT) with a color mask. In SDTV, the size of the color mask spot determines the size of the spot that is scanned across the screen when a video image is rendered. The size of the spot is matched to the frequency bandwidth of the video system. The spot size is kept large to prevent aliasing (i.e., the appearance of high frequency noise as low frequency terms) and to keep the displayed signal bright. In a sense, the television acts as a two dimensional filter of an image, which, in most cases, limits the frequency response of the system.

Displaying HDTV information on HD equipment is similar. Again, the display acts as a final two dimensional filter that limits the overall system response. HD equipment is designed to match the bandwidth of the HDTV signal.

While displaying SDTV and HDTV information on their respective equipment is known, the situation becomes more complex when displaying SDTV information on HD equipment. In this situation, the HD equipment has much more spatial bandwidth than does the SDTV signal. Thus, to display a SDTV signal on HD equipment, the SDTV signal must be upsampled. That is, the information in the SDTV signal must be extrapolated, or augmented.

Upsampling itself is a challenging, but known, task. However, upsampling is made more difficult by digital television operators who use many different SDTV resolutions when broadcasting SDTV signals. For example, a digital versatile disk (DVD) source outputs 720 pixels per line, while a digital television operator, such as DIRECTV®, may provide programming ranging from 352 pixels per line to 720 pixels per line. In such an arrangement, an upsampler designed for 720 pixel resolution will make 352 pixel information look poor on the HDTV display.

HD equipment providers, such as DIRECTV®, validate receiver designs prior to deploying those designs in the field. Conventionally, upsampling from SDTV to HDTV is tested through application of a test signal(s) at the beginning of the receiver filter chain. The output of the filter chain is then evaluated to determine upsampler performance. Conventional test signals include steps, pulses, and sweeps having responses that provide information as to the horizontal, vertical, and temporal resolution of the system.

However, typically, HD equipment, such as STBs, are highly integrated and, thus, the ability to isolate the upsamplers, which are typically the source of poor image quality, is limited, as the input to the upsampler is not exposed for test signal injection. For example, a conventional transmitter and receiver lineup includes a motion pictures expert group (MPEG) encoder and an MPEG decoder, each having filtering or prefiltering, that influence test results and prevent isolation and measurement of upsampler performance.

BRIEF DESCRIPTION OF THE DRAWINGS

FIG. 4 is a block diagram of an example disclosed test system.

FIG. 5 is a block diagram of an example test signal generator of FIG. 4.

FIG. 6 is a block diagram of an example test encoder of FIG. 5.

DETAILED DESCRIPTION

While the following disclosure is made with respect to example DIRECTV® broadcast services and systems, it should be understood that many other delivery systems are readily applicable to disclosed system. Such systems include wired or cable distribution systems, UHF/VHF radio frequency systems or other terrestrial broadcast systems (e.g., MMDS, LMDS, etc.), and fiber optic networks.

Figure 1:
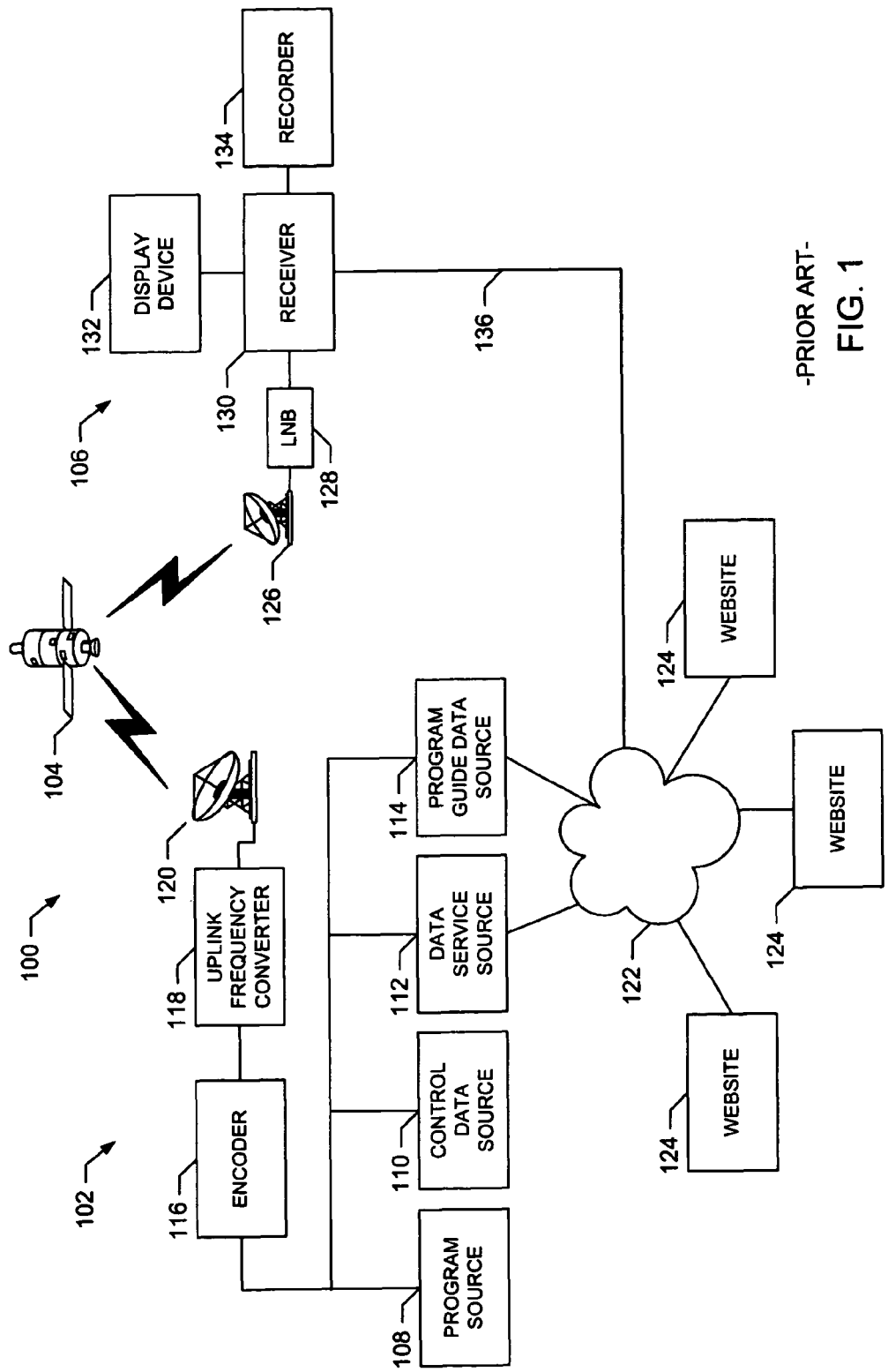
FIG. 1 is a diagram of an example programming distribution system.

As shown in FIG. 1, an example direct-to-home (DTH) system 100 generally includes a transmission station 102, a satellite/relay 104, and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection.

In further detail, the example transmission station 102 of FIG. 1 includes a program source 108, a control data source 110, a data service source 112, and one or more program guide data sources 114. During operation, information from one or more of these sources 108-114 passes to an encoder 116, which encodes the information for broadcast to the satellite/relay 104. As described below in detail in conjunction with FIGS. 2 and 3, encoding may include, for example, converting the information into data streams that are multiplexed into a packetized data stream or bitstream using a number of conventional algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave and passes the modulated carrier wave to an uplink antenna 120, which broadcasts the information to the satellite/relay 104. In a conventional manner, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music, or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program source 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. As described in detail below, the receiver station 106 gathers the SCIDs related to the game, wherein the program guide data source 114 has previously provided to the receiver station 106 a list of SCIDs that correspond to the game.

The satellite/relay 104 receives the modulated, encoded Ku-band bitstream and re-broadcasts it downward toward an area on earth that includes the receiver station 106. As shown in FIG. 1, the example receiver station 106 includes a reception antenna 126 connected to a low-noise-block (LNB) 128 that is further connected to a receiver 130. The receiver 130 may be a set-top box or may be a personal computer (PC) having a receiver card installed therein. A display device 132, such as, for example, a television or a computer monitor, is coupled to the receiver 130 for displaying received programming to a user. Additionally, the example receiver station 106 may include a recorder 134 used to record programming received by the receiver station 106. The recorder 134 may be, for example, a device capable of recording information on media, such as videotape or digital media such as a hard disk drive, a digital versatile disk (DVD), a compact disk (CD) and/or any other suitable media.

Although not necessary for proper operation of the disclosed system, the receiver station 106 may optionally incorporate a connection 136 (e.g., Ethernet circuit or modem for communicating over the Internet) to the network 122 for transmitting requests and other data back to the transmission station 102 (or a device managing the transmission station 102 and overall flow of data in the system 100) and for communicating with websites 124 to obtain information therefrom.

In operation of the receiver station 106, the reception antenna 126 receives signals including a bitstream from the satellite 104. The signals are coupled from the reception antenna 126 to the LNB 128, which amplifies and, optionally, downconverts the received signals. The LNB output is then provided to the receiver 130, which, as described in detail below, receives, depacketizes, demultiplexes and decodes the received signal to provide audio and video signals to the display device 132 and/or the recorder 134. The receiver 130 is responsive to user inputs to tune to a particular program, by selecting and decoding a particular frequency and the particular SCIDs on which the desired program is located.

Figure 2:
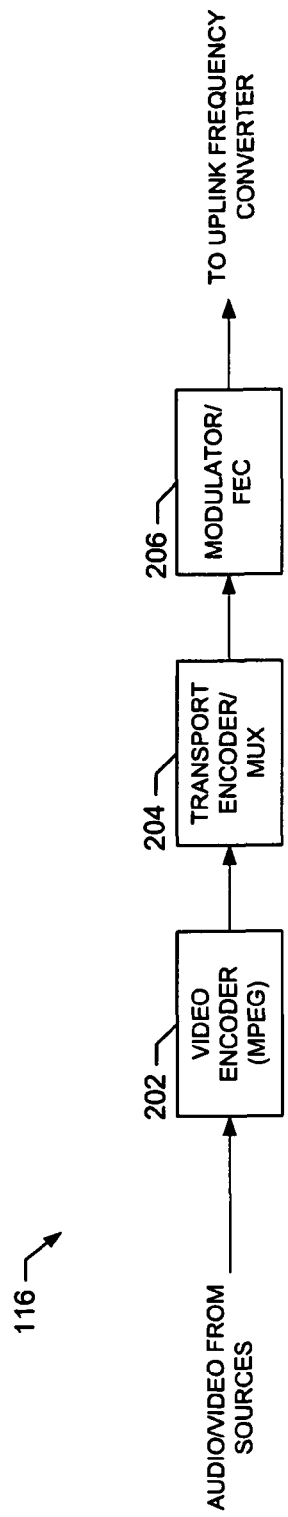
FIG. 2 is a diagram of an example encoder of FIG. 1.

As shown in FIG. 2, the encoder 116, in one example, includes a video encoder 202, a transport encoder/multiplexer 204, and a modulator/forward error correction module (FEC) 206. The encoder 116 may also include an audio encoder, which is not shown. Generally, in operation, video information from the audio and video sources is provided to the video encoder 202, which may be a motion pictures expert group (MPEG) encoder or any other suitable video encoder. If the information from the audio and video sources is provided in an analog format, the information is sampled prior to encoding. On the other hand, the information from the audio and video information sources may be provided in a digital format that is ready to be encoded. In any event, the information from the audio and video sources is compressed by the video encoded 202 to facilitate efficient transmission of the information. For example, the information may be MPEG compressed using a discrete cosine transformation (DCT). The result of MPEG video encoding is a series of frames including varying amounts of information. For example, MPEG intracoded frames (I-frames) include a complete image of the video frame being processed. Additionally, MPEG encoding may result in predictive encoded frames (P-frames) and bidirectionally encoded frames (B-frames), each of which includes less information that I-frames and only have meaning when compared to one or more I-frames.

As is known to those having ordinary skill in the art, the transport encoder/multiplexer 204, prepares the frames from the video encoder 202 for transmission over a signal path from the transmission station 102 to the receiver station(s) 106, via the satellite/relay 104. Such encoding prepares the encoded video for distortion that will occur when traversing the satellite channel. Additionally, the encoded video from the video encoder 202 may be multiplexed with other information to provide a stream of data from the transport encoder/multiplexer 204 that includes audio and/or video from numerous programs or program sources. Additionally, conditional access encryption may be applied.

The modulator/FEC 206 performs forward error correction on the information prior to modulation of the information on a baseband signal that will be upconverted for transmission by the uplink frequency converter 118. This processing is carried out in ways well known to those having ordinary skill in the art.

Figure 3:
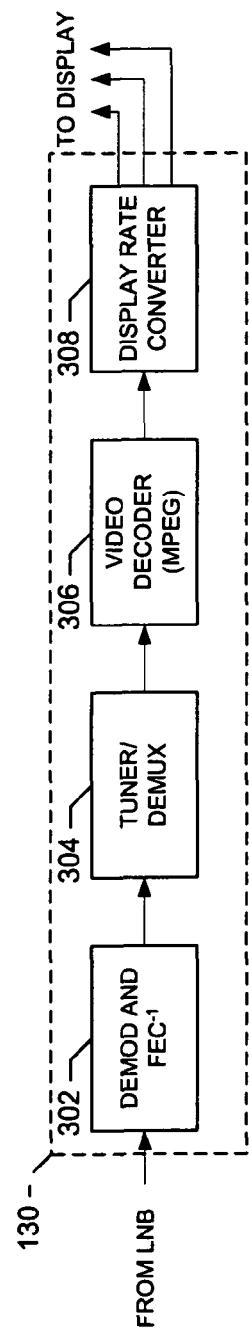
FIG. 3 is a diagram of an example receiver of FIG. 1.

On the receive side, the signal from the LNB 128 is provided to the receiver 130. The receiver 130 includes hardware and software that provides a number of different functions, one of which is the processing of signals received from the LNB 128. It is this receiving functionality that is shown in FIG. 3. As will be readily appreciated by those having ordinary skill in the art, the diagram of FIG. 3 represents functions implemented in hardware and/or software that reverses the processing performed by the functions represented in FIG. 2.

In particular, a demodulator and inverse FEC 302 demodulate a received signal to obtain a bitstream and error correct that bitstream in accordance with the FEC performed at block 206. A tuner/demultiplexer 304 then selects a particular portion of the information stream and demultiplexes the stream to obtain the selected portion. A video decoder 306, such as an MPEG decoder, decompresses the bitstream into full rate information to be displayed on a display screen. The receiver 130 may also include conditional access functionality to decrypt received information that was encrypted before broadcast.

However, when there is a difference between the resolution of the full rate video and the display capabilities/requirements of the display screen a display rate converter 308 up or down samples the information from the video decoder 306 and provides the same display rate and resolution of the display device. As will be readily appreciated, the display rate converter 308 is most often used when displaying SDTV on HD display equipment (i.e., on an "HDTV"). This is because the HDTV display requires more information to display an image that is contained in the SDTV signal. For example, SDTV signal may have any of the following sizes (in pixels): 352×480i, 480×480i, 544×480i, 720×480i, 720×480p, while the high definition display may be 1280×720p, 1280×1080i, 1440×1080i, 1920×1080i where "i" denotes interlaced and "p" denotes progressive. In one example, SDTV signals having any one of these resolutions must be upsampled to HDTV resolution, which may be, for example, 1920×1080i. Of course, other SDTV and HDTV resolutions exist and may be used.

As noted above, conventionally, the display rate converter 308 may be the weak point in the receiver. That is, display rate converters having different designs may dramatically affect the quality with which upsampled video appears on a display screen. An example disclosed test system 400 of FIG. 4 provides the ability to test the performance of a receiver and, in particular, the display rate converter of the receiver. In general, this is performed by generating video that, when processed by the receiver, produces a step function at an output of a decoder, such as an MPEG decoder, that feeds a display rate converter. In this manner, the frequency response of the display rate converter may be measured and a fidelity/performance evaluation of the display rate converter, and the receiver as a whole, may be made. Measurements may be made to test horizontal response, vertical response, and temporal response of a display rate converter.

As shown in FIG. 4, the system 400 includes a test image 402 that is viewed by a camera 404. Further detail regarding one example test image is provided below in conjunction with FIG. 8. In general, test images are configured to produce, when viewed, a video signal having a step function that will be provided to a display rate converter of a device under test. As will be explained below, the test pattern may be designed to test horizontal, vertical, and/or temporal response of the device under test.

The camera 404 may be a SDTV camera or any other camera having any suitable resolution, or be a synthetically generated image creation device. In fact, the camera 404 may have a programmable resolution output to facilitate the testing of the device under test under a number of different input conditions.

The output of the camera 404 is coupled to a test signal generator 406, which prepares a signal for testing a device under test 408, also referred to as a device under test. Of course, as will be readily appreciated by those having ordinary skill in the art, the image produced by the camera 404 observing the test image 402 may be stored and recalled. Thus, it is not necessary for a camera 404 and a test image 402 to be used. Alternatively, the signal produced by the test signal generator 406 may be stored and recalled. Further detail regarding the test signal generator 406 is provided below in conjunction with FIGS. 5 and 6. In operation, the test signal generator 406 is coupled to an input of the device under test 408. The test signal generator 406 enables testing of the device under test 408 without the need to employ a satellite link or other system hardware, as the test signal generator 406 outputs signals at frequencies and levels similar to those the device under test 408 would receive from a satellite. In this manner, the device under test 408 may be tested in a laboratory (or any other suitable setting).

A measurement device 410 is coupled to the output of the device under test to make a determination as to the performance of the device under test 408. In one example, the measurement device 410 may be an oscilloscope that is manually controlled to measure certain aspects of the signal (s) output from the device under test 408 using luminance or color difference information. Alternatively, the measurement device 410 may be implemented using automated test equipment capable of measuring signal(s) (e.g., through the use of Fourier transformations) from the device under test 408 and comparing the same to an acceptable set of signal parameters.

As shown in FIG. 5, in one implementation, the test signal generator 406 includes a test encoder 502, a transport encoder 504, a conditional access block 506, a modulator/FEC 508, and an uplink frequency converter 510. As described below in detail in conjunction with FIG. 6, the test encoder 502 processes information from the camera or other image information to produce an valid MPEG-encoded signal having characteristic that produces a step function when processed by an MPEG decoder (i.e., the MPEG decoder in the device under test). Of course, the encoded test signal could itself be stored and recalled as needed. In this way, the operation of the display rate converter in the device under test may be evaluated. The remaining blocks 504-510 process the signal from the test encoder 502 in a manner such that the device under test is unaware that it is not receiving a valid MPEG-encoded satellite signal for display and processing. It is likewise obvious to those skilled in the art that the resulting bitstream coming from FIG. 5 may be recorded and played back, in what is called a "bitstream test."

As shown in FIG. 6, an example implementation of a test encoder (a modified MPEG-2 video encoder) 502 includes a block detector 602, a discrete cosine transform (DCT) converter 604, and an AC term nuller 606. The encoder being modified MPEG-2 encoder with the addition of the AC term nuller 606. FIG. 6 being a simplified block diagram. As will be readily appreciated, any or all of these units may be implemented using dedicated hardware and/or software or firmware executed on hardware. During operation, first the block detector 602 breaks the video samples from the camera (or an intervening analog-to-digital converter) into 8×8 blocks. The chroma information provided by the camera is broken into 8×8 blocks of one half the luminance horizontal and vertical sampling rates.

The blocks from the block detector 602 are provided to the DCT converter 604, which performs a discrete cosine transformation on the blocks. As will be readily appreciated by those having ordinary skill in the art, the DCT blocks contain direct current (DC) and alternating current (AC) information represented as quantized coefficients. For example, a block of video may be represented by 64 coefficients, one coefficient representing the DC term and the remaining coefficients representing the AC terms of the video block.

The output of the DCT converter 604, which includes terms representing both AC and DC components in the video and/or chroma blocks, are passed to the AC term nuller 606. The AC term nuller 606 zeroes, or nulls, the AC terms in each video and/or chroma block, leaving only the DC terms as non-zeroes. Thus, each block is represented by a single coefficient, the coefficient representing the DC term. The output of the nuller, feeds the rest of the MPEG-2 encoder, providing a compliant MPEG-2 bitstream.

Additionally, the AC term nuller 606 may modify or quantize the DC terms. For example, in a system in which "0" represents black, "1" represents white, and "0.5" represents gray, the DC terms close to "0" may be set to "0.2" and the DC terms close to "1" may be set to "0.8." This controls the dynamic range of the signal being processed and eliminates any undesired clipping of the output signal.

In a sense, the test encoder 502 operates as a crippled or modified MPEG encoder that produces valid MPEG-encoded streams, but the steams include nothing but DC components. In particular, the test encoder 502 differs from a conventional MPEG encoder in that it does not include prefiltering, may not process motion vectors, and nulls AC coefficients resulting from the DCT. The output of an MPEG encoder processing such a stream would be generally not be visually desirable because it results in video that appears badly blocked. However, for testing purposes, the test encoder produces a signal that is good for evaluating the operation of the device under test 408. The combination of the test encoder 502 and an input signal provided by the camera 404 viewing the test image 402 (or an equivalent stored image) results in a wideband step function at the output of an MPEG decoder.

As will be readily appreciated, a number of test signals can be made for testing different dimensions of an upsampler and its attendant upsampling filter. In each case, a step transition generated at the output of the MPEG decoder of the device under test, which is upstream from the upsampler. As described below in detail, the results of the upsampler can be observed at an analog output and/or at a digital output (e.g., S-video) of the device under test.

Figure 7:
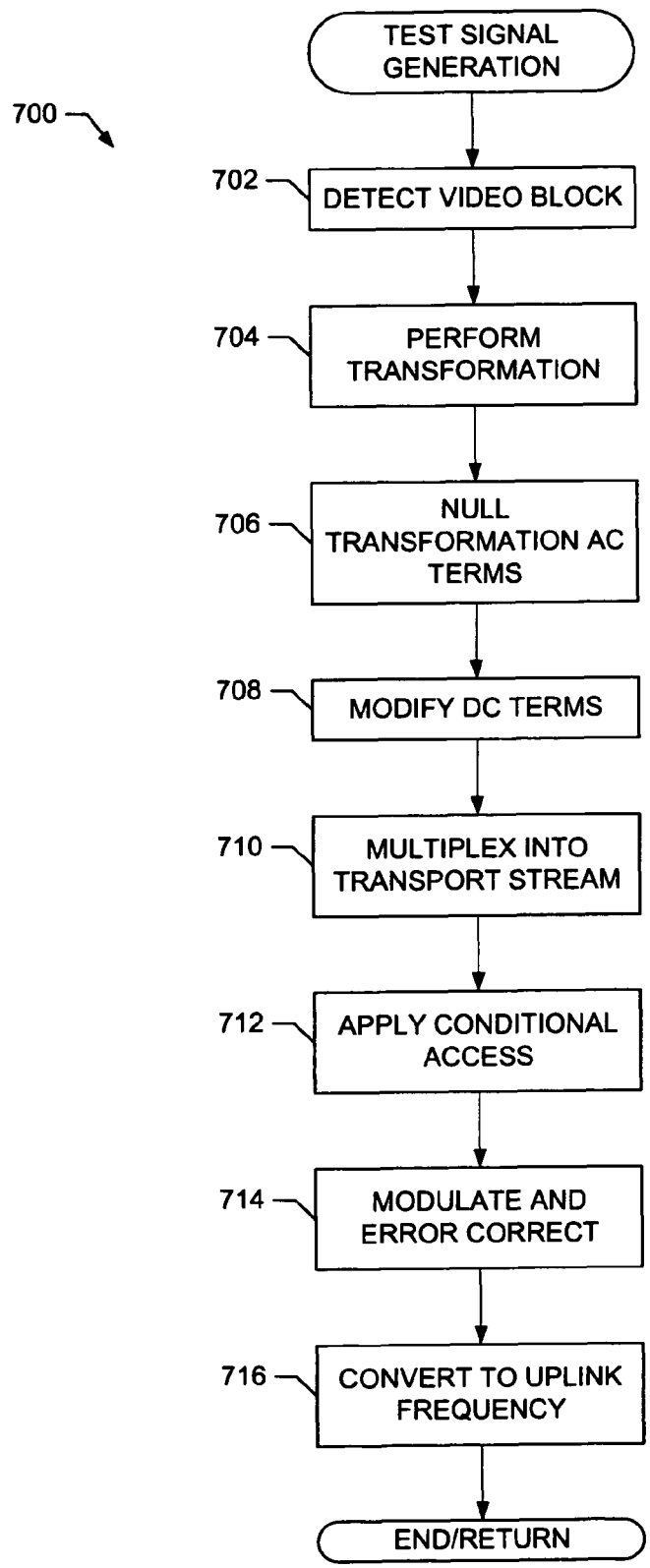
FIG. 7 is a flow diagram illustrating an example test signal generation process.

A test signal generation process 700 is illustrated in FIG. 7. As will be readily appreciated by those having ordinary skill in the art, the process 700 may be implemented using dedicated hardware or hardware executing software or firmware. Additionally, some of the aspects of the process 700 may be carried out manually. Furthermore, while FIG. 7 shows the process 700 as occurring in a particular order, such an order is merely one example of the order in which the process 700 may be carried out.

Upon execution, the process 700 detects video blocks in a video stream on which the process is operating (block 702). The blocks may be of various sizes, or may be of one consistent size. For example, as noted above, the blocks may have pixel sizes of 8×8 and may be blocks of luminance or chrominance information.

After the blocks have been detected (block 702), the process 700 performs a transformation on the blocks (block 704). For example, as noted above, the transformation may be a DCT or any other suitable transformation that converts spatial information into a data set representative of that spatial information. For example, each block of image information (i.e., chrominance or luminance information) may be represented by a series of coefficients. In one example, the coefficients represent the relative magnitudes of the DC and various frequency AC terms in the image information, resulting in a series of 16, 32, or 64 coefficients.

After the data is transformed (e.g., using a DCT) the process 700 nulls the AC terms resulting from the transformation (block 706). For example, if each block was represented by a single DC term and a number of AC terms, the DC term is not nulled, but the AC terms are nulled to zero, or otherwise designated as not having value. The process 700 may also optionally adjust or modify the DC terms representing the blocks of image information (block 708). This optional modification may be carried out to, for example, prevent saturation or clipping of any DC terms. For example, each DC term greater than 0.5 may be modified to be 0.8 and each DC term less than 0.5 may be modified to be 0.2. In this manner, the levels of the DC terms are relatively consistent to help ensure a relatively clean step function resulting from the decoding of the coefficients. The output of 708 is then encapsulated into an MPEG-2 compliant elementary stream and then transport packetized using standard methods 709.

Thus, while the MPEG packets are valid and can be processed just like any other MPEG packet, the video resulting from the modified MPEG packets is used for diagnostic purposes and are not particularly interesting to viewers.

To prepare the modified MPEG packets for processing by a STB, such as an integrated receiver decoder (IRD), the modified MPEG packets are processed in a manner identical to the processing of MPEG packets in any conventional distribution system. Taking the DIRECTV® distribution system for example, the modified MPEG packets are multiplexed into a transport stream (block 710), processed with conditional access information (block 712), modulated and error corrected (block 714), and converted to an uplink frequency (block 716).

As will be readily appreciated by those having ordinary skill in the art, the processing of the modified MPEG packets is determined by the type of receiver being tested. That is, the goal of the subsequent processing of the modified MPEG packets is to provide the equipment under test (e.g., the receiver/decoder) with a signal that is identical to a signal that the equipment under test would normally receive, except that the content of the signal causes the equipment under test to behave in a manner that, when monitored, reveals performance issues in the equipment under test. In this manner, integrated receivers can be performance tested without opening their housings by simply providing the test signal to the input port of the equipment under test.

As noted above, when equipment under test receives the test signal, which includes the modified MPEG packets, the equipment under test processes the modified MPEG packets. The processing of the MPEG packets produces a broad step function at the output of an MPEG decoder of the equipment under test. This step function, when coupled to an upsampler, tests the performance of the upsampler. The performance of the upsampler may be evaluated by testing a signal output from the equipment under test at a video output port, such as a component or S-video output. By measuring characteristics of that output signal, the fidelity of the upsampler may be determined.

Figure 8:
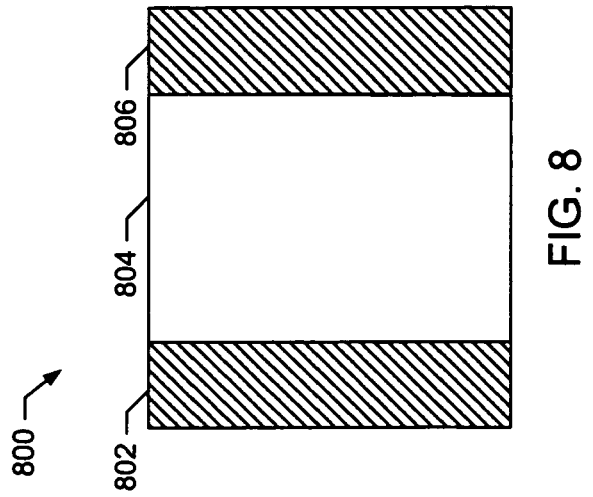
FIG. 8 is an example test image, which could be observed by a camera and displayed on a display screen.

FIG. 8 is one example of an image 800 could be used as a test image 402 (FIG. 4) that could be observed by the camera 404 and that would be generated on a video display in response to equipment under test processing a modified MPEG packet. As shown in FIG. 8, the image 800 includes a first dark portion (shown in cross hatch) 802 adjacent a light portion 804, which is adjacent a second dark portion (also shown in cross hatch) 806. The dark portions 802, 806 in the image 800 result from the DC components being set to 0.2, whereas the light portion 804 results from the DC components being set to 0.8. Thus, the resulting image 800 includes two portions that are 20% of full white and one portion that is 80% of full white. The transitions between the light and dark portions may be chosen such that they align exactly on a boundary between the light and dark portions of luminance and chrominance signals in the modified MPEG stream.

Figure 11:
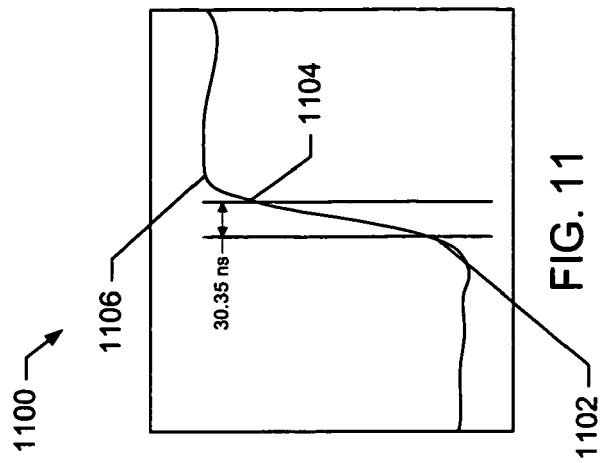
FIG. 11 is a drawing of a signal measured by the measurement device of FIG. 4, showing an acceptable response.
Figure 10:
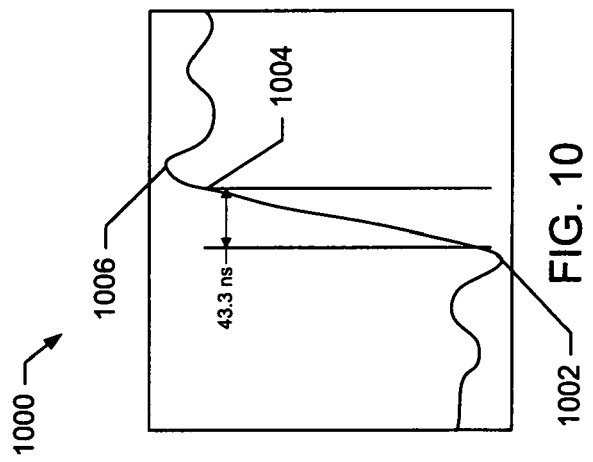
FIG. 10 is drawing of a signal measured by the measurement device of FIG. 4, showing an unacceptable response.
Figure 9:
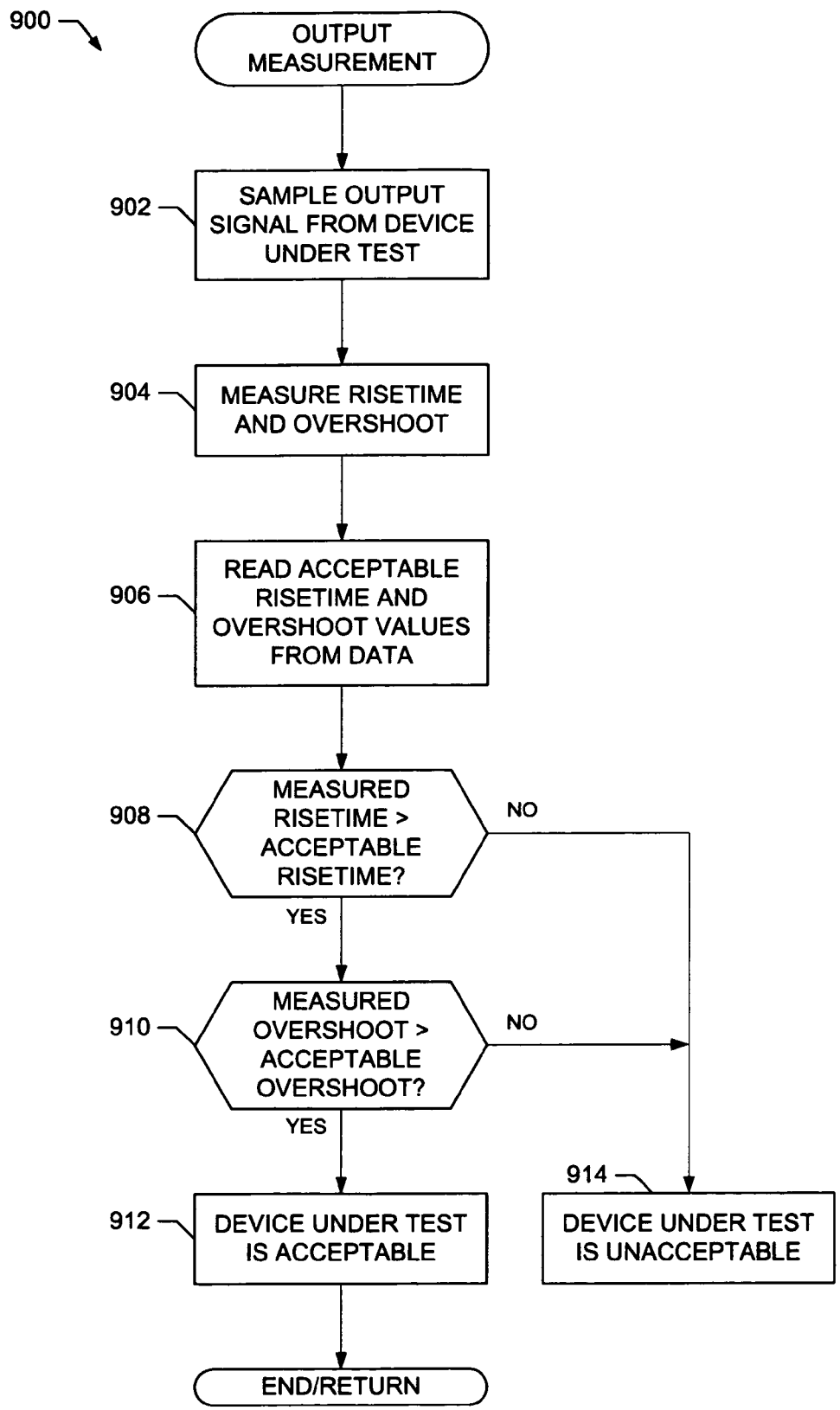
FIG. 9 is a flow diagram illustrating an example output measurement process.

A process 900 for evaluating a device under test through measurement of its output is shown in FIG. 9. The process 900 samples the output signal from the device(s) under test (block 902). In one example, a 1920×1080i image from a device under test may be sampled with an oscilloscope. The results of sampling carried out on two different devices under test are shown in FIGS. 10 and 11 and described below. In each case, the encoder was operating with a horizontal resolution of 480 pixels. Thus, the upsampler in the devices under test must convert the 480 pixel image to a 1920 pixel image in the horizontal direction.

After the output signal has been sampled, the rise time and the overshoot of the signal at the light to dark (or dark to light) transition are measured (block 904). As shown in FIG. 10, a signal 1000 from a first device under test has a point 1002 at which the dark to light transition begins, a transient portion 1004 during which the transition takes place, and a point 1006 at which the dark to light transition is complete. The risetime of the signal 1000 is approximately 43 nanoseconds (ns) and has pre and post ringing of nearly 18%. This information implies that the horizontal filter is essentially a linear phase brick wall filter. Ringing in the signal 1000 indicates that image enhancement will occur, such as amplification of high frequency components, when the equipment under test processes video MPEG packets. For compressed MPEG images, this enhancement makes blocking artifacts much more observable.

As shown in FIG. 11, a signal 1100 from a second device under test has a point 1102 at which the dark to light transition beings, a transient portion 1104 during which the transition takes place, and a point 1106 at which the dark to light transition is complete. The risetime of the signal 1100 is approximately 30 ns and has very little pre and post ringing. This information indicates that the horizontal filtering is highly effective because the risetime is short and the ringing is negligible.

After the risetimes have been measured (block 904), the process 900 reads acceptable risetime and overshoot information. The risetime and overshoot data may be stored in a computer readable medium, in a chart, or in any other location. For example, acceptable risetime and overshoot data may vary based on input format (e.g., 352×480i, 480×480i, 544×480i, 720×480i, 720×480p, 1280×720p, 1280×1080i, 1440×1080i, 1920×1080i), display mode (e.g., 480i, 720p, 1080i), and signals measured (e.g., NTSC, S video, HDTV, horizontal and vertical, luminance and/or chrominance), etc. The following ranges and values of risetimes and overshoot are merely examples of risetimes and overshoots that may be deemed acceptable. In fact, other ranges may be determined by those having ordinary skill in the art.

For example, acceptable 480i display mode horizontal risetimes for NTSC and S video for a range of input formats may be between about 73 nanoseconds (nS) and about 112 nS for luminance, about 146 nS to 224 nS for chrominance; vertical risetimes may be about 63 microseconds (uS) and may have overshoot values between about 3% and about 10%. Acceptable 480i display mode HDTV horizontal risetimes for luminance (Y) may range between about 73 nS and about 112 nS, whereas chrominance (Pr/Pb) risetimes may range between about 146 nS and about 224 nS. Acceptable overshoot may range between about 5% and about 10%. Acceptable 480i display mode HDTV vertical risetimes for luminance (Y) and chrominance (Pr/Pb) may be approximately 63 uS and may have an overshoot as high as about 3%.

With regard to 720p display mode measurements, acceptable HDTV horizontal risetimes for luminance (Y) may range between about 13 nS and about 26 nS, whereas chrominance (Pr/Pb) risetimes may range between about 26 nS and about 52 nS. Acceptable overshoot may range between about 2% and about 10%. With regard to 720p display mode measurements, acceptable HDTV vertical risetimes for luminance (Y) and chrominance (Pr/Pb) may be approximately 22 uS and overshoot may be as high as about 3%.

With regard to 1080i display mode measurements, acceptable HDTV horizontal risetimes for luminance (Y) may range between about 13 nS and about 40 nS, whereas chrominance (Pr/Pb) risetimes may range between about 26 nS and about 80 nS. Acceptable overshoot may range between about 2% and about 10%. With regard to 1080i display mode measurements, acceptable HDTV vertical risetimes for luminance (Y) and chrominance (Pr/Pb) may be approximately 29 uS and overshoot may be as high as about 3%.

The process 900 then compares the measured risetime with the acceptable risetime (block 908). Thus, the 43 ns and the 30 ns values determined in FIGS. 10 and 11 at block 904, would be compared to reference values. If the measured risetime is not acceptable (block 908), the device under test is deemed to be unacceptable, or as failing test (block 914).

If, however, the measured risetime is acceptable (block 908), the measured overshoot is compared to acceptable overshoot values (block 910). If the overshoot is not acceptable (block 910), the device under test is indicated to be unacceptable (block 914). Alternatively, if both the measured risetime and the measured overshoot are acceptable, the device under test is deemed to be acceptable (block 912).

As will be readily appreciated by those having ordinary skill in the art, various other signal parameters may be measured at the transition between light and dark video. Thus, risetime and overshoot are merely examples of characteristics that indicate that an upsampler and, more generally, a receiver/decoder is not optimally designed and will not process video signals for display in an optimal manner.

A device under test may be tested numerous different ways using numerous different test patterns and signal resolutions. For example, horizontal, vertical, and temporal responses may be measured using various test patterns and each test pattern may be used at any number of different input and output resolutions. Thus, a device under test may be thoroughly tested in a number of different respects. Further, any of the foregoing may be tested using chrominance and/or luminance values. Additionally, color difference test signals may be created by holding luminance constant and having a step occur in R-Y and B-Y, either separately or together. Furthermore, test signals of the same resolution may be combined together to provide a single composite test signal that tests all spatial axis, luminance and color difference signals at the same time. A temporal test signal may be created using a checker-board pattern that flips polarity every few frames.

Figure 12:
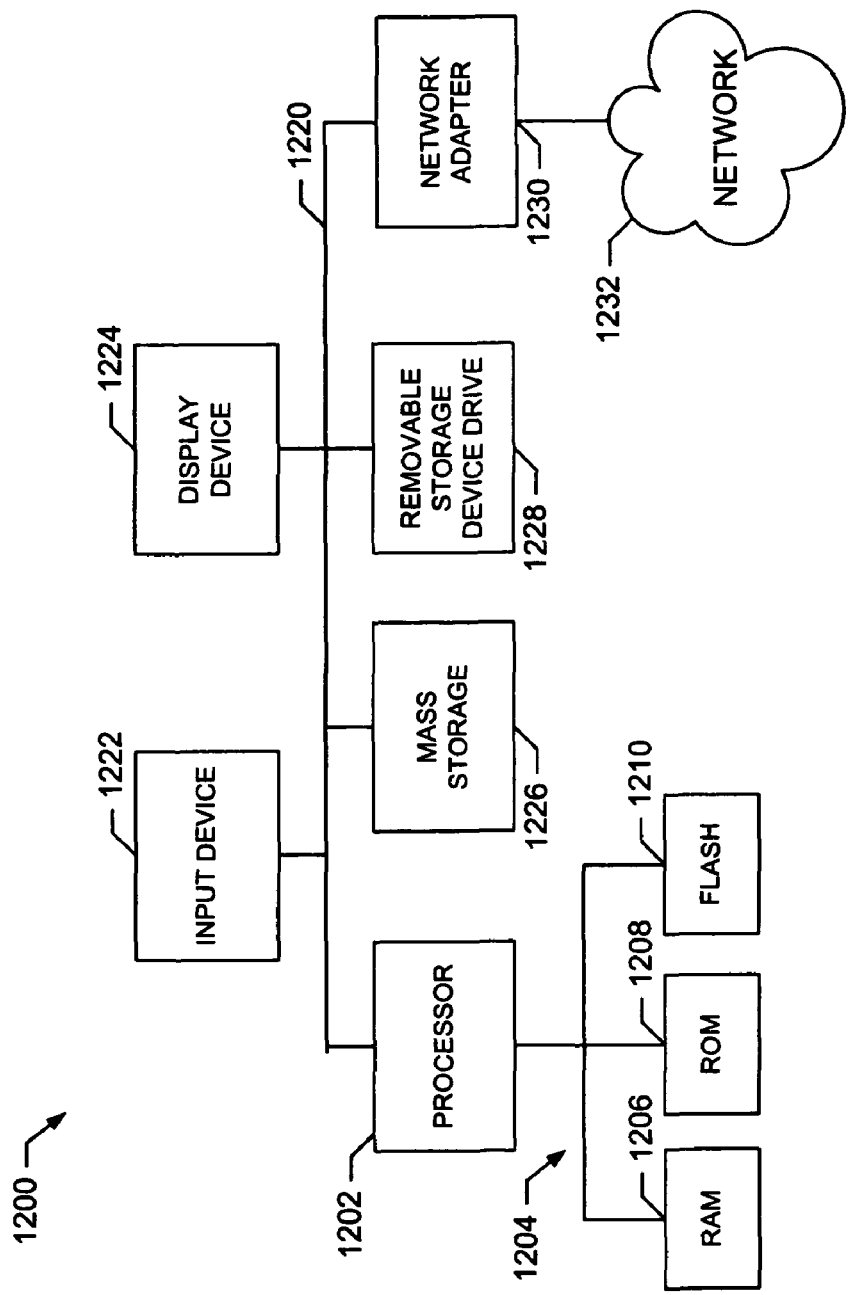
FIG. 12 is a block diagram of an example processor system on which the processes of FIGS. 7 and 9 may be implemented.

As shown in FIG. 12, an example processor system 1200, which may be used to implement the processes shown in FIGS. 7 and 9 includes a processor 1202 having associated memories 1204, such as a random access memory (RAM) 1206, a read only memory (ROM) 1208, and a flash memory 1210. The processor 1202 is coupled to an interface, such as a bus 1220 to which other components may be interfaced. In the illustrated example, the components interfaced to the bus 1220 include an input device 1222, a display device 1224, a mass storage device 1226, and a removable storage device drive 1228. The removable storage device drive 1228 may include associated removable storage media (not shown), such as magnetic or optical media. The processor system w00 may also include a network adapter 1230.

The example processor system 1200 may be, for example, a server, a remote device, a conventional desktop personal computer, a notebook computer, a workstation or any other computing device. The processor 1202 may be any type of processing unit. The processor 1202 may include on-board analog-to-digital (A/D) and digital-to-analog (D/A) converters.

The memories 1204 that are coupled to the processor 1202 may be any suitable memory devices and may be sized to fit the storage and operational demands of the system 1200. In particular, the flash memory 1210 may be a non-volatile memory that is accessed and erased on a block-by-block basis and that stores instructions that cause the processor 1202 to act as explained above in conjunction with FIGS. 7 and 9.

The input device 1222 may be implemented using a keyboard, a mouse, a touch screen, a track pad or any other device that enables a user to provide information to the processor 1202.

The display device 1224 may be, for example, a liquid crystal display (LCD) monitor, a cathode ray tube (CRT) monitor or any other suitable device that acts as an interface between the processor 1202 and a user. The display device 1224 includes any additional hardware required to interface a display screen to the processor 1202.

The mass storage device 1226 may be, for example, a conventional hard drive or any other magnetic or optical media that is readable by the processor 1202.

The removable storage device drive 1228 may be, for example, an optical drive, such as a compact disk-recordable (CD-R) drive, a compact disk-rewritable (CD-RW) drive, a digital versatile disk (DVD) drive, or any other optical drive. The removable storage device drive 1228 may alternatively be, for example, a magnetic media drive. If the removable storage device drive 1228 is an optical drive, the removable storage media used by the drive 1228 may be a CD-R disk, a CD-RW disk, a DVD disk, or any other suitable optical disk. On the other hand, if the removable storage device drive 48 is a magnetic media device, the removable storage media used by the drive 1228 may be, for example, a diskette or any other suitable magnetic storage media.

The network adapter 1230 may be any suitable network interface such as, for example, an Ethernet card, a wireless network card, a modem, or any other network interface suitable to connect the processor system 1200 to a network 1232. The network 1232 to which the processor system 1200 is connected may be, for example, a local area network (LAN), a wide area network (WAN), the Internet, or any other network. For example, the network could be a home network, a intranet located in a place of business, a closed network linking various locations of a business, or the Internet.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method of testing receiver video fidelity, wherein the receiver includes a decoder, a display rate converter, and an output, the method comprising:
    producing a video test signal;
    transforming the video test signal to include direct current terms and alternating current terms;
    nulling values of the alternating current terms of the video test signal;
    communicating the video test signal including the null values of the alternating current terms and the direct current terms to an input of the receiver; and
    measuring signal characteristics of signals provided at the receiver output.

2. A method as defined by claim 1, wherein producing the video test signal comprises recalling the video test signal from storage.

3. A method as defined by claim 1, wherein producing the video test signal includes:
    converting the video test signal including the direct current terms and the nulled alternating current terms into a format compatible with the input of the receiver.

4. A method as defined by claim 1, wherein transforming the video test signal to include the direct current terms and the alternating current terms includes performing a discrete cosine transformation.

5. A method as defined by claim 1, wherein the video test signal is configured to cause the decoder to output a step function signal upon processing the video test signal.

6. A method as defined by claim 3, wherein converting the video test signal includes multiplexing, applying conditional access, modulating, error correcting, or upconverting.

7. A method as defined in claim 5, further comprising coupling the step function signal to the display rate converter.

8. A method as defined by claim 1, further comprising comparing the measured signal characteristics of the output signals to reference data indicating acceptable measured signal characteristics.

9. A method as defined by claim 1, wherein the measured signal characteristics at the output include one or more of signal risetime and signal overshoot.

10. A method as defined by claim 9, wherein when the risetime measured signal characteristic is longer than risetime specified in the reference data, the receiver video fidelity is determined to be unacceptable.

11. A system for testing receiver video fidelity, wherein the receiver includes a decoder, a display rate converter, and an output, the system comprising:
   a block detector to receive a video signal and detect video blocks therein;
   a transformer to transform the detected video blocks into direct current coefficients and alternating current coefficients;
   a coefficient nuller to null values of the alternating current coefficients, wherein
   the nulled values of the alternating current coefficients and the direct current coefficients are included in a video test signal to be provided to the receiver; and
   a measurement device to measure signal characteristics of signals provided at the receiver output.

12. A system as defined by claim 11, wherein the transformer performs a discrete cosine transformation on the detected video blocks.

13. A system as defined by claim 11, further comprising a converter to convert the nulled values of the alternating current coefficients and the direct current coefficient into the video test signal to be provided to the receiver, the converter comprising:
   an encoder to encode the nulled alternating current coefficients and the direct current coefficients into a transport signal;
   a modulator and forward error corrector for processing the transport signal; and
   an uplink frequency converter to upconvert the processed transport signal.

14. A system as defined by claim 11, wherein the measurement device compares the measured signal characteristics of the output signals to reference data indicating acceptable measured signal characteristics.

15. A system as defined by claim 11, wherein the measured signal characteristics include one or more of signal risetime and signal overshoot.

16. A system as defined by claim 15, wherein when the risetime measured signal characteristic is longer than a risetime specified in the reference data, the system indicates that the receiver video fidelity is unacceptable.

17. An article of manufacture comprising a machine-accessible medium having a plurality of machine accessible instructions that, when executed, cause a machine to test receiver video fidelity, wherein the receiver includes a decoder, a display rate converter, and an output, wherein the instructions cause the machine to:
   produce a video test signal;
   transform the video test signal to include direct current terms and alternating current terms;
   null values of the alternating current terms of the video test signal;
   communicate the video test signal including the null values of the alternating current terms and the direct current terms to an input of the receiver; and
   measure signal characteristics of signals provided at the receiver output.

18. A machine-accessible medium as defined by claim 17 having instructions stored thereon that, when executed, cause a machine to produce the video test signal by recalling the video test signal from storage.

19. A machine-accessible medium as defined by claim 17 having instructions stored thereon that, when executed, cause a machine to produce the video test signal by
   converting the video test signal including the direct current terms and the nulled alternating current terms into a format compatible with the input of the receiver.

20. A machine-accessible medium as defined by claim 17 having instructions stored thereon that, when executed, cause a machine to transform the video signal to include nulling the direct current terms and the alternating current terms by performing a discrete cosine transformation.

\* \* \* \* \*